(12) United States Patent
Steuernagel et al.

(10) Patent No.: US 8,612,080 B2
(45) Date of Patent: Dec. 17, 2013

(54) METHOD FOR OPERATING A HYBRID DRIVE

(75) Inventors: Frank Steuernagel, Stuttgart (DE); Peter Deuble, Moeglingen (DE); Sascha Dreschmann, Renningen/Malmsheim (DE); Manfred Hellmann, Hardthof (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 13/329,453

(22) Filed: Dec. 19, 2011

(65) Prior Publication Data
US 2012/0158231 A1 Jun. 21, 2012

(30) Foreign Application Priority Data
Dec. 17, 2010 (DE) .......................... 10 2010 063 332

(51) Int. Cl.
*B60L 9/00* (2006.01)
(52) U.S. Cl.
USPC ......................... 701/22; 180/65.265; 903/930
(58) Field of Classification Search
USPC .......... 701/22; 180/65.265; 903/930; 307/9.1
See application file for complete search history.

(56) References Cited

U.S. PATENT DOCUMENTS

| | | | |
|---|---|---|---|
| 6,188,944 B1 * | 2/2001 | Kolmanovsky et al. | 701/54 |
| 8,246,510 B2 * | 8/2012 | Michishita et al. | 477/8 |
| 2001/0025220 A1 | 9/2001 | Kaneko et al. | |
| 2002/0161507 A1 | 10/2002 | Fuse | |
| 2002/0174796 A1 | 11/2002 | Kumar et al. | |
| 2003/0199353 A1 * | 10/2003 | Bowen | 475/5 |
| 2009/0321153 A1 * | 12/2009 | Boeckenhoff et al. | 180/24.1 |
| 2011/0213519 A1 * | 9/2011 | Huber | 701/22 |

\* cited by examiner

*Primary Examiner* — Yonel Beaulieu
(74) *Attorney, Agent, or Firm* — Michael Best & Friedrich LLP

(57) ABSTRACT

A hybrid drive (52) of a motor vehicle (50). In the motor vehicle (50), an electric motor (58) acts as the driving force on a first axle (54) and an internal combustion engine (60) as a driving force on a second axle (56). In an operation, in which only the electric motor (58) acts on the first axle (54), a check is made to determine whether the internal combustion engine (60) is to be started to drive the second axle (56), wherein a first set of conditions for a road start, taking into account first criteria, and a second set of conditions for a starter motor start, taking into account second criteria, are defined and checks are made independently of one another to determine whether the first set of conditions for a road start or the second set of conditions for a starter motor start has been met.

11 Claims, 2 Drawing Sheets

METHOD FOR OPERATING A HYBRID DRIVE

BACKGROUND OF THE INVENTION

The invention relates to a method for operating a hybrid drive for a vehicle and to a corresponding hybrid drive.

A hybrid drive, which is typically used in a motor vehicle, is characterized in that at least two different energy converters and two different energy storage devices are used for traction purposes, i.e. for driving the motor vehicle. Advantages of the hybrid drive result from lowering the energy consumption and reducing exhaust gas and noise emissions.

Motor vehicles, in which a hybrid drive is used, are also denoted as hybrid vehicles. In a type of hybrid vehicle which is already frequently in use, an electrical drive is available in addition to the internal combustion engine to provide the driving force or rather forward propulsion of said vehicle. In so doing, there are various embodiments in which the electrical energy is used for the propulsion of the vehicle.

In the American patent publication US 2002/174796, a drive for a motor vehicle is described, which comprises an energy storage and regeneration system. This system makes energy available for use when required. Braking energy is in turn stored in the system. The system can comprise a flywheel, a battery, a capacitor or a combination of these energy storage devices.

An embodiment of a hybrid vehicle, which is denoted as an axle hybrid, provides that the direct drive of one vehicle axle takes place with an electric machine, that is to say with an electric motor, whereas the second axle is driven with an internal combustion engine. The electric axle can be used to drive the vehicle as well as to charge the battery.

In an operating mode of the axle hybrid vehicle, provision is made for a purely electric driving operation, in which the internal combustion engine is at rest and the forward propulsion results only with the electric motor. In order to be able to use said internal combustion engine for the forward propulsion of the vehicle, said engine must initially be started. This can result on the one hand using a conventional starter, respectively starter motor, which is subsequently denoted in the present application as a starter motor start, or on the other hand while driving by means of tow-starting the internal combustion engine by the electric motor, wherein the kinetic energy of the vehicle is used. The latter is referred to as a road start in the present application. A set of conditions exists for deciding whether to start said internal combustion engine. Said conditions comprise, e.g., the state of charge of the battery (SOC: state of charge), the vehicle speed, the torque desired by the driver, wheel speeds, yaw rate and the steering wheel angle.

Because the number of internal combustion engine starts, which can be carried out via a starter, are limited by the service life of the starter motor, it is recommended to use the road start as frequently as possible to start the internal combustion engine.

SUMMARY OF THE INVENTION

Two sets of conditions are therefore defined according to the proposed method, which in turn take criteria into account that typically relate to the driving situation of the hybrid vehicle as well as to the state of the battery as an energy storage device and the states of the drives.

The hybrid vehicle is particularly embodied as an axle hybrid and is provided to implement the proposed method.

By reducing the number of starter motor starts, an economically priced starter motor can furthermore be installed. Without any measures in place, the road start has, however, the disadvantage of being noticeable to the driver and therefore as being perceived to be uncomfortable. In order to avoid this, the power output which is required for starting the internal combustion engine using a road start is balanced by the electric motor. A complete balancing is, however, only then possible if the electric motor has a sufficient torque (in this case torque reserve) at its disposal in order to support the road start.

The required electric motor torque for restarting the internal combustion engine depends on the drive train gear ratio of the internal combustion engine branch, the gear ratio of the electric motor branch and the drag torque of the internal combustion engine. The torque reserve available to the electric motor is thereby a function of the torque desired by the driver and the currently maximum possible electric motor torque.

A further aspect with regard to the selection of the starting mode is the road conditions. The functions specific to hybrid vehicles like recuperation, boosting, automatic start-stop control and driving solely with electric energy create important interactions from the power train onto the driving dynamics in hybrid vehicles having electric axle drive. This is also true in the case of a vehicle being on a road having a low coefficient of friction (low:road). Selection of the starting mode also takes into account whether the vehicle is in or heading into an unstable driving condition.

The road conditions particularly have direct effects on vehicles having one or a plurality of electrically driven axles. This is the case because a yaw moment analogous to a mechanical all-wheel-drive is produced via this electrically driven axle. In the event of the vehicle being situated on a surface having a low coefficient friction, no starts should be carried out over the road in order to not endanger the driving stability of the vehicle.

Further advantages and embodiments of the invention ensue from the description and the accompanying drawings.

It goes without saying that the features previously mentioned and those still to be explained below can not only be used in the combination stated in each case but also in other combinations or in isolation without departing from the scope of the present invention.

DETAILED DESCRIPTION

Figure 1:
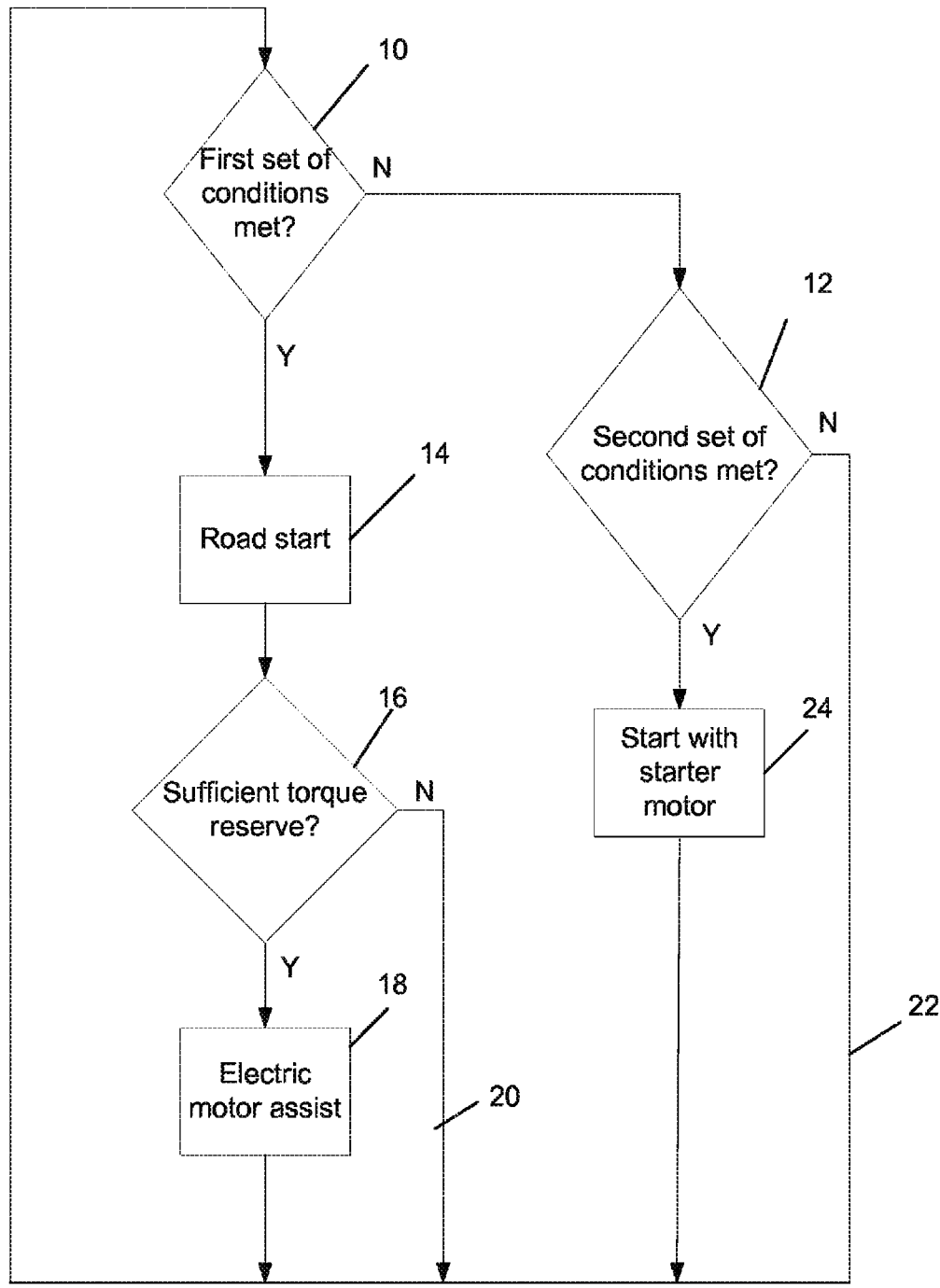
FIG. 1 shows an embodiment of the method described in a flow diagram.

Based on embodiments, the invention is schematically depicted in the drawings and is subsequently described in detail with reference to the drawings.

A sequence of events of an embodiment of the method described is illustrated in a flow diagram in FIG. 1. The depiction shows how an internal combustion engine is started as required. The routine explained with the aid of the flow diagram can take place continuously.

It is assumed that the motor vehicle is initially driven only with the electric propulsion provided by the electric motor. The check routine provides henceforth that a check is made in a first step 10 to determine whether a first set of conditions has been met for a road start. These conditions take various criteria into account, which relate, e.g., to the state of charge of the battery, the road condition, the torque desired by the driver, the vehicle speed, the torque reserve of the electric motor, wheel speeds, the yaw rate and the steering wheel angle. It must be emphasized that depending on the application, further criteria or respectively conditions can be taken into account. A selection of the conditions which are taken into account takes place, e.g., as a function of the vehicle type or also as a function of the driving situation.

In the first step 10, a check is especially made to test the composition of the road, upon which the motor vehicle is situated. The coefficient of friction is, e.g., thereby ascertained. When the coefficients of friction are low (low μ) as, for example, in the case of black ice, a road start should not take place. If this condition or any other of the conditions that have been checked is not met, a second set of conditions is checked in a further step 12.

If all of the conditions are met in step 10, the road start takes place in step 14. In this case, a further check is made in step 16 as to whether the electric motor has sufficient torque reserve. If this is the case, the electric motor assists the road start (Step 18). If a sufficient torque reserve is not provided, the road start takes place without torque balancing by the electric motor (branch 20).

After the usage of the internal combustion engine has been completed, said engine having been started in accordance with the depicted routine, the routine begins anew with step 10. As previously mentioned, this routine can be run through continuously. Provision can alternatively be made for the routine to be run through at regular intervals or also as a function of events.

If the conditions in step 10 are not met, the second set of conditions is checked in step 12 as previously mentioned. These conditions take various criteria into account that, e.g., relate to the state of charge of the battery, the road condition, the torque desired by the driver, the vehicle speed, the torque reserve of the electric motor, wheel speeds, the yaw rate and the steering wheel angle. It should also be emphasized in this instance that further criteria or respectively conditions can be taken into account depending on the application. A selection of the conditions, which are to be taken into account, can result as a function of the vehicle type or also as a function of the driving conditions.

If these second conditions are not met (branch 22), the routine begins anew with step 10. If the second conditions are met, the starting of the internal combustion engine takes place with the starter motor (step 24). After switching off the internal combustion engine, which can occur after a certain amount of time or if it is then determined that this additional propulsion is no longer required, the routine begins anew with step 10.

It is important to note that the first set of conditions and the second set of conditions can at least partially take the same criteria into account. The road condition can thus be checked in step 10 as well as in step 12. Furthermore, the presence of a torque desired by the driver is typically a necessary condition for both steps. Provision can, however, be made in this case for other thresholds, e.g., the amount of torque desired by the driver or a certain coefficient of friction of the road, to have to be exceeded or undershot in order for the condition to be regarded as being met.

By selecting the thresholds, particularly by selecting levels of the thresholds in the first set of conditions (step 10) which are different when compared to those in the second set of conditions (step 12), it is possible to specify how frequently a road start occurs in comparison to a starter motor start. The frequency of starter motor starts, which should be reduced in order to reduce the wear on the starter motor, can therefore also be limited.

The electric motor torque $M_{ES}$ at least required for a road start can be calculated as follows:

$$M_{ES} = i_{VM}/i_{EM} * M_{VS}$$

wherein:
$i_{VM}$=gear ratio of the drive train with internal combustion engine (as a function of the transmission ratio, respectively the selected gear)
$i_{EM}$=gear ratio of the drive train with electric motor
$M_{VS}$=current drag torque of the internal combustion engine (is made available by the engine management system)

The current torque reserve of the electric drive is calculated as follows:

$$M_{Res} = M_{EMax} - M_{Evor}$$

wherein:
$M_{EMax}$: maximum tractive torque of the electric drive which can currently be adjusted (as a rule as a function of the current rotational speed of the electric motor and the state of charge of the battery)
$M_{Evor}$: currently adjusted tractive torque of the electric drive Two sets of conditions are therefore defined. The first set defines the conditions for a road start, the second set the conditions for a starter motor start. The first set comprises in the configuration thereof the current torque reserve $M_{Res}$ in addition to the known conditions, as, e.g., the current state of charge of the battery, the torque desired by the driver, vehicle speed, etc. The second set defines the conditions for the starter motor start, which can correspond to the conditions pursuant to prior art, i.e. essentially the state of charge of the battery, the torque desired by the driver and the driving speed.

In the embodiment of the method shown in FIG. 1, the conditions for the road start are checked in a first step 10; and as the case may be, a road start is carried out. Provided that the internal combustion engine has not already been started, the conditions for the starter motor start are checked; and as the case may be, a starter motor start is carried out in a second step 12.

The first set of conditions can be selected such that a sufficient number of road starts is carried out so that the number of starter motor starts is not exceeded during the service life of the vehicle. For this reason, a low SOC threshold, as it is defined in the set of conditions for the starter motor start, can, e.g., be selected for the conditions for the road start. Various thresholds can also be defined for further common conditions in order to reduce the number of starter motor starts in the event said starts are approaching the service life limit.

Via the standard evaluation of the ESP control unit, the yaw rate, the steering wheel angle and the wheel rotations, a factor can be determined which can give evidence about the current dynamic state of the vehicle. In low : regions as well as in driving conditions, which are dynamically critical, neither a road start nor a stop should be carried out.

Figure 2:
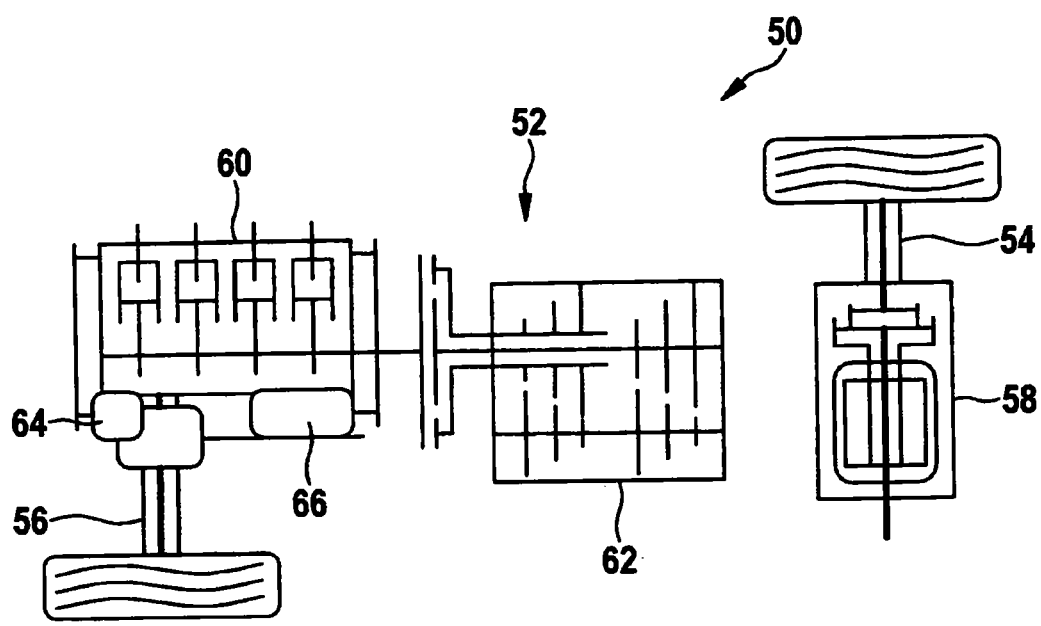
FIG. 2 shows an embodiment of a hybrid vehicle in a schematic depiction.

A motor vehicle is depicted in FIG. 2, which in its entirety is denoted with the reference numeral 50. The motor vehicle 50 comprises a hybrid drive 52 and a first axle 54 and a second axle 56. The hybrid drive 52 in turn comprises an electric motor 58 which acts as a driving force on the first axle 54, and an internal combustion engine 60 which acts as a driving force on the second axle 56.

The motor vehicle 50 further comprises a dual clutch transmission 62, a generator 64 and a starter motor 66. The driving of electric motor 58 and internal combustion engine 60 is coordinated with the dual clutch transmission 62.

The propulsion of the motor vehicle 50 can take place solely with the electrical propulsion provided by the electric motor 58. In certain driving situations, if, e.g., a torque desired by the driver is present, which exceeds a certain threshold, the internal combustion engine can be added as a further drive unit. To do so, it is necessary for said internal combustion engine to be started. This start-up can take place with the starter motor 66 or by way of a road start, wherein the kinetic energy of the motor vehicle 50 is used.

Conditions, which in turn take the criteria characterizing the driving situation into account, are used in making the decision whether a starter motor start or a road start should occur. In so doing, a first set of conditions for the road start and a second set of conditions for the starter motor start exist. In order for these conditions to be met, predetermined thresholds have to be exceeded or undershot. If thresholds, which relate to identical criteria, are present in the first set of conditions and in the second set of conditions, said thresholds may be selected so as to differ. The threshold at one condition, which takes into account a torque desired by the driver as a criterion, is, for example, selected differently in the first set of conditions than in the second set of conditions.

In this way, it is possible to specify the ratio of frequencies of the different starting procedures with respect to one another. The target of limiting the frequency of starter motor starts can therefore be taken into account. This ratio can also be adjusted over the service life of the motor vehicle 50 by changing the thresholds.

The invention claimed is:

1. A method for operating a hybrid drive (52) of a motor vehicle (50), having an electric motor (58) that acts as a driving force on a first axle (54) of the motor vehicle (50) and an internal combustion engine (60) that acts as a driving force on a second axle (56) of the motor vehicle (50), for an operation, in which only the electric motor (58) acts on the first axle (54), to determine whether the internal combustion engine (60) is to be started to drive the second axle (56), the method comprising:
    defining a first criteria for a first set of conditions for a road start using the kinetic energy of the vehicle;
    defining a second criteria for a second set of conditions for a starter motor start;
    determining, by a control unit, whether the first criteria for the first set of conditions are met for a road start;
    determining, by the control unit, whether the second criteria for the second set of conditions are met for a starter motor start; and
    starting, by the control unit, the internal combustion engine (60) using the road start when the first criteria is met.

2. The method according to claim 1, wherein the determining whether the second criteria for the second set of conditions are met for a starter motor start is performed after determining that the first criteria for the first set of conditions for a road start has not been met.

3. The method according to claim 1, wherein, in the event that the first set of conditions for a road start has been met, a torque balancing takes place by means of the electric motor (58) during the road start.

4. The method according to claim 3, wherein the torque balancing takes place after determining a sufficiently large torque reserve is available to the electric motor (58).

5. The method according to claim 1, wherein whether the first set of conditions meet the first criteria is continuously determined.

6. The method according to claim 1, wherein whether the second set of conditions meet the second criteria is continuously determined.

7. The method according to claim 1, wherein the first set of conditions takes at least one of the following criteria into account: state of charge of the battery, road condition, torque desired by the driver, vehicle speed, torque reserve of the electric motor, wheel speeds, yaw rate, steering wheel angle.

8. The method according to claim 1, wherein the second set of conditions takes at least one of the following criteria into account: state of charge of the battery, road condition, torque desired by the driver, vehicle speed, torque reserve of the electric motor, wheel speeds, yaw rate, steering wheel angle.

9. The method according to claim 1, wherein when a condition is identical in the first and second set of conditions, different thresholds are set for meeting said condition.

10. A hybrid drive for a motor vehicle (50), in which an electric motor (58) acts as a driving force on a first axle (54) of the motor vehicle (50) and an internal combustion engine (60) acts as a driving force on a second axle (56) of said motor vehicle (50), wherein on the basis of an operation, in which only the electric motor (58) acts on the first axle (54), said hybrid drive is designed to check whether the internal combustion engine (60) is to be started to drive the second axle (56), wherein a first set of conditions for a road start using the kinetic energy of the vehicle, which take first criteria into account, and a second set of conditions for a starter motor start, which take second criteria into account, are defined, wherein checks are made independently of one another to determine whether the first set of conditions for a road start or the second set of conditions for a starter motor start has been met, and wherein the internal combustion engine (60) is started using the road start when the first set of conditions is met.

11. The hybrid drive according to claim 10, wherein when a condition is identical in the first and second set of conditions, different thresholds are set for meeting said condition.

* * * * *